United States Patent [19]

Kopp et al.

[11] 4,390,786

[45] Jun. 28, 1983

[54] NEUTRON DETECTION APPARATUS

[75] Inventors: Manfred K. Kopp, Oak Ridge; Kenneth H. Valentine, Lenoir City, both of Tenn.

[73] Assignee: The United States of America as represented by The United States Department of Energy, Washington, D.C.

[21] Appl. No.: 257,031

[22] Filed: Apr. 24, 1981

[51] Int. Cl.³ .............................................. G01T 1/18
[52] U.S. Cl. .................................... 250/385; 250/390
[58] Field of Search ............... 250/385, 390, 392, 374; 376/154

[56] References Cited

U.S. PATENT DOCUMENTS 2,604,600  7/1952  Neufeld .............................. 250/385
3,562,528  2/1971  Joyce ............................. 250/385 X
4,345,155  8/1982  Allemand et al. .................. 250/385

OTHER PUBLICATIONS

Hess et al, "Delay-Line Chamber has Large Area, Low Capacitance", *Nucleonics,* Mar. 1957, vol. 15, No. 3, pp. 74–79.

Primary Examiner—Davis L. Willis
Attorney, Agent, or Firm—Edwin D. Grant; Stephen D. Hamel; Richard G. Besha

[57] ABSTRACT

An atomic fission counting apparatus used for neutron detection is provided with spirally curved electrode plates uniformly spaced apart in a circular array and coated with fissile material.

13 Claims, 3 Drawing Figures

NEUTRON DETECTION APPARATUS

BACKGROUND OF THE INVENTION

This invention, which is the result of a contract with the U.S. Department of Energy, relates to a means for measuring neutron flux and, more particularly, to an apparatus which detects fission of atomic nuclei resulting from neutron capture.

Neutron flux is measured by instruments wherein fission fragments resulting from neutron induced splitting of uranium-235 atoms ionize a gas and thereby generate countable electrical signals. The uranium-235 used in such neutron detection devices is applied as a thin coating to electrode plates, and if these plates have a large surface area, the detection efficiency of these devices becomes comparable with $BF_3$ gas proportional counters. To obtain a large electrode surface area, neutron detection devices have heretofore been provided with a plurality of either stacked, flat electrodes or concentric, cylindrical electrodes, both of which arrangements have certain disadvantages. For instance, such neutron detection devices do not provide a large electrode surface area in a compact housing. It is particularly difficult to limit the size of the type of stacked plate neutron detector wherein inductors are connected between the plates to form a delay line in the electrical circuitry of the detector (as in the ion chamber described by W. Hess, H. Patterson and R. Wallace in an article titled "Delay-line Chamber Has Large Area, Low Capacitance", which appeared in Nucleonics magazine in March, 1957). The durability of stacked plate neutron detectors is also reduced by the small, fragile insulators required between plates, and in addition, signal noise generated in this type of detector can mask signals produced by neutron induced fission events.

SUMMARY OF THE INVENTION

It is therefore an object of this invention to provide an improved apparatus for detecting neutron induced fission of atomic nuclei.

A second object of the invention is to provide an ionization chamber wherein a plurality of electrode plates are arranged in a compact and stable array.

Another object of the invention is to provide an arrangement of electrode plates that can conveniently be connected to one or more arrays of the same type to form plate assemblies of different lengths.

These objects are attained by a preferred embodiment of the invention comprising a plurality of electrode plates uniformly spaced apart from one another in a circular array about an axis like blades of a paddle wheel, each of said electrode plates having a spiral-arc configuration in a plane perpendicularly to said axis, said electrode plates spiralling in the same direction relative to said axis with the spacing between adjacent plates remaining constant as distance from said axis increases, and said electrode plates being coated with fissile material such as uranium-235.

DETAILED DESCRIPTION OF THE PREFERRED EMBODIMENT OF THE INVENTION

Figure 1:
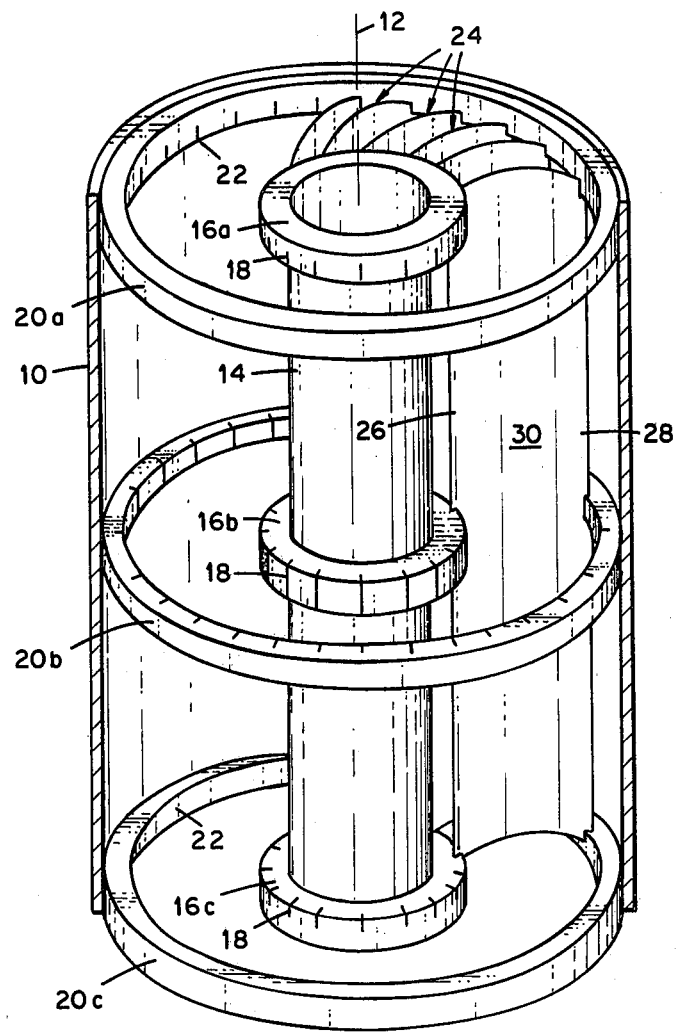
FIG. 1 is a pictorial representation of components of the preferred embodiment of the invention, the wall of a housing being broken away therein so that these components can be seen.

In FIG. 1 reference number 10 designates a cylindrical wall concentric with the longitudinal axis 12 of a central support tube 14, this wall being cut away in the drawing so that other components contained therein can be seen. Covers (not shown) are respectively attached to the ends of wall 10 to form a hermetically sealed housing. Mounted in longitudinally spaced relation on support tube 14 are three inner support rings 16a–16c each formed of a dielectric material and each having a plurality of slots 18 spaced apart from one another about the outer periphery thereof. More particularly, support ring 16b is located at the middle of support tube 14, and support rings 16a and 16c are respectively located at opposite ends of said support tube. Three outer support rings 20a–20c are respectively concentrically spaced around support rings 16a–16c, and each of these outer support rings is also formed of a dielectric material and has a plurality of slots 22 spaced apart from one another about the inner periphery thereof. Reference number 24 generally designates each of a plurality of identically shaped electrode plates (only six of which are illustrated in FIG. 1 to simplify the drawing), these electrode plates being disposed between inner and outer support rings 16a–16c and attached thereto by extension of their inner edge portions 26 and their outer edge portions 28 respectively into slots 18 on the inner rings and slots 22 on the outer rings. The side surfaces 30 of electrode plates 24 are coated with fissile material, such as uranium-235.

Figure 2:
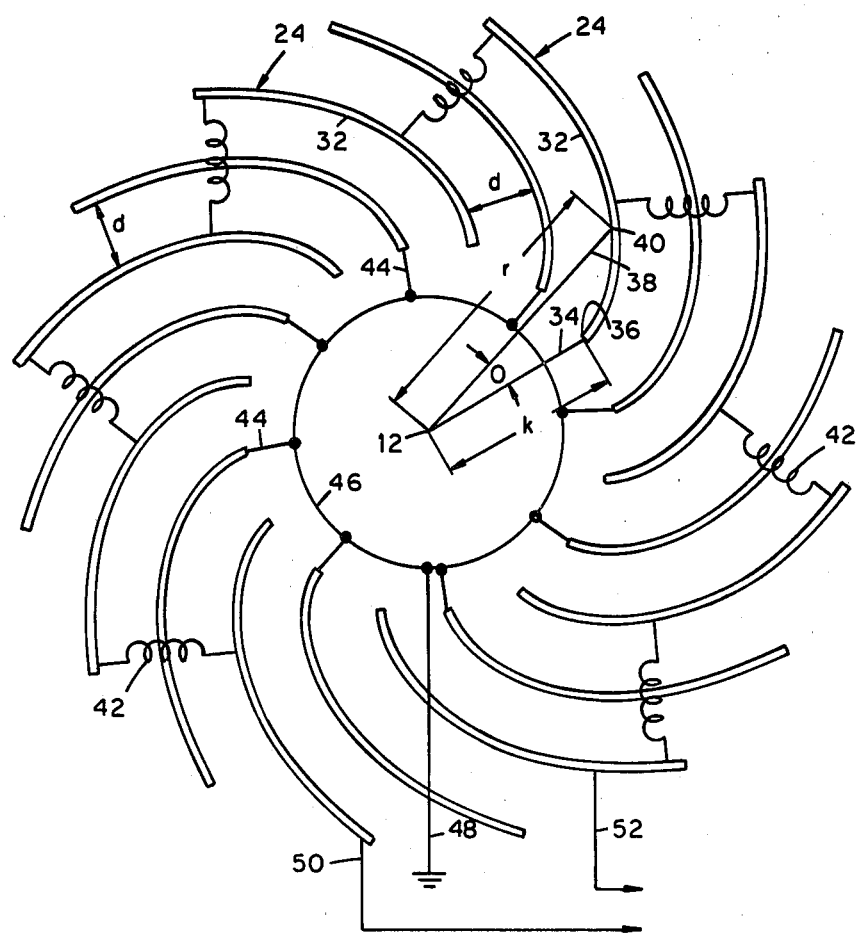
FIG. 2 is a plan view of electrode plates illustrated in FIG. 1, with electrical components associated therewith being shown in schematic form.

The arrangement of electrode plates 24 can best be understood by reference to FIG. 2, wherein the curvature of the plates is illustrated relative to a plane perpendicular to axis 12. The spiral-arc configuration of the line 32 which represents a curved side surface of each electrode plate 24 in FIG. 2 is defined by the following equation:

$$\theta = \sqrt{\frac{r^2}{k^2} - 1} - \cos^{-1}\left(\frac{k}{r}\right)$$

wherein
$\theta$ = the angle, expressed in radians, between (1) a line 34 which intersects an inner edge 36 of an electrode plate and which is perpendicular to and intersects axis 12, and (2) a line 38 which intersects any selected point 40 on the side surface extending from said inner edge 36 of the same electrode plate and which is perpendicular to and intersects axis 12;
$r$ = the distance between axis 12 and point 40, and
$k$ = the minimum permissible spacing between axis 12 and the inner edge 36 of the electrode plate, which depends upon the desired center-to-center spacing of the electrode plates.

The spacing d between adjacent electrode plates 24 having the curvature defined by the above equation remains constant as the electrode plates spiral outwardly and the distance between their side surfaces and axis 12 increases.

Figure 3:
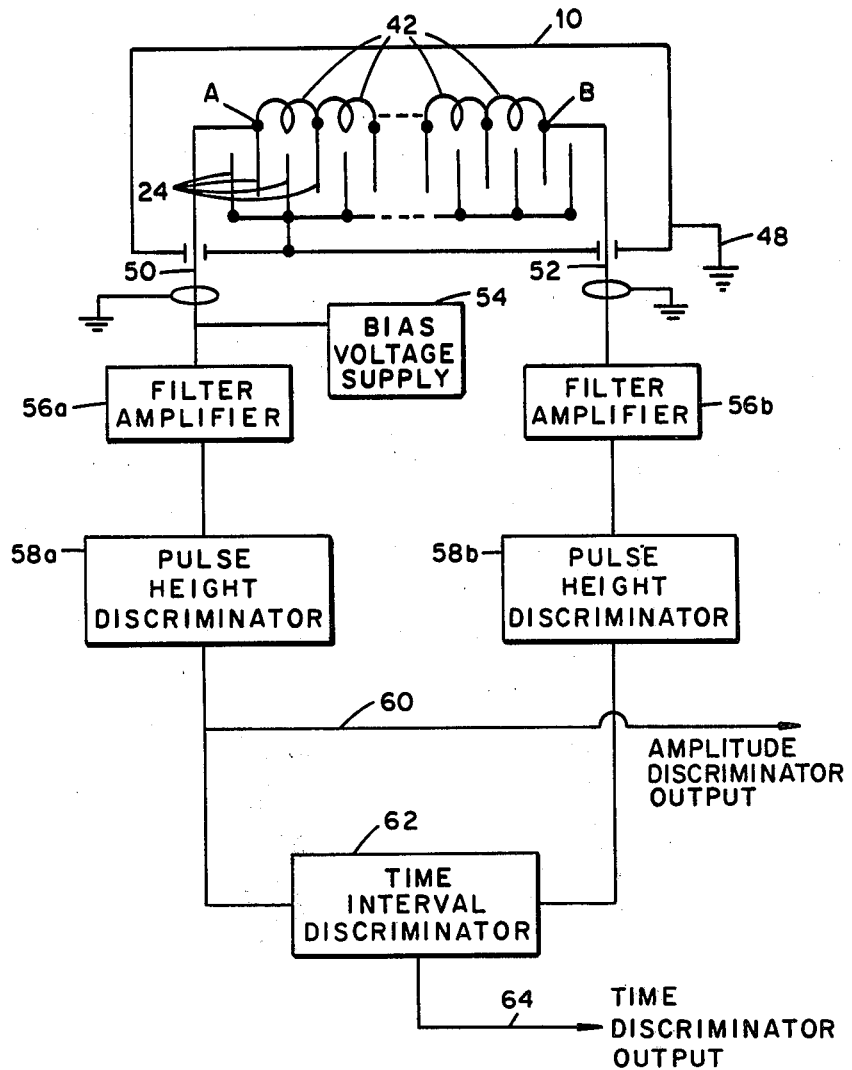
FIG. 3 is a schematic representation of electrical circuitry used for sensing electric signals generated by the apparatus illustrated in FIGS. 1 and 2.

In the preferred embodiment of the invention, alternate electrode plates are electrically coupled together by inductors 42 as illustrated in FIG. 2, and the other electrode plates are coupled together by conductive means 44, 46 connected to ground by a lead 48. Conductive means 44, 46 may include the cylindrical wall 10 of the housing for the electrode plates, as illustrated in FIG. 3. The ends of the delay line formed by the inductively coupled electrode plates are connected by leads 50, 52 to a signal analysis system comprising two filter amplifiers 56a, 56b, two pulse height discriminators 58a, 58b, and a time interval discriminator 62. A voltage supply 54 provides a high voltage bias to one end of the delay line via the lead 50.

Each filter amplifier and pulse height discriminator subsystem will be recognized as a conventional pulse amplitude analyzer. If this output is desired, it is available on lead 60. The time interval discriminator 62 provides an output on lead 64 of the desired fission pulses while simultaneously discriminating against the alpha, gamma, and noise pile-up pulses. Each fission pulse produces two output pulses on leads 50, 52 that occur within the 200 ns length of the delay line. The spurious alpha, gamma, and noise pulses generally do not produce pulses on leads 50, 52 within the 200 ns interval.

Perferably the ionizable gas in the housing which encloses electrode plates 24 is a mixture consisting of 80% argon and 20% carbon tetrafluoride, wherein ion drift velocity is about three times that in conventional argon-nitrogen mixtures.

OPERATION OF THE PREFERRED EMBODIMENT OF THE INVENTION

As will be understood by persons skilled in the art to which this invention pertains, when a neutron induced fission event occurs on one of the electrode plates 24, similar current pulses propagate from the electrode plate toward the opposite ends of the delay line formed by the inductivity coupled electrode plates, i.e, toward points A and B in FIG. 3. Thus if the time required for a voltage pulse to travel the length of the delay line is 200 nanoseconds, the occurrence of a neutron induced pulse at one end of the delay line at time $t_o$ necessarily implies the occurrence of a pulse at the other end of the delay line within the time interval $t_o \pm 200$ nanoseconds. However, interfering pulses are also introduced into the delay line from electrode plates 24 by gamma rays and alpha particle activity of the $^{234}U$ which is always present in the enriched uranium coated on the electrode plates, and the ratio of the width of these pulses to the total signal delay time of the delay line is so small that the pileup signals at the ends of the delay line are uncorrelated in time. Thus a random occurrence that results in a large pileup signal at one end of the delay line at time $t_o$ does not imply a similar large pulse at the other end of the line in the time interval $t_o \pm 200$ nanoseconds, and the pulse will not be counted. The preferred embodiment of this invention eliminates the counting of pulses resulting from gamma rays and alpha particle activity by means of the time interval discriminator 62, this time discrimination circuitry being combined with conventional amplitude discrimination means 58a, 58b.

Charged particles traveling across the electrode plates of a conventional stacked plate type of neutron detector create long paths of gas ionization between the electrode plates which result in large noise signals in the detector. The curvature of electrode plates 24 limits the distance alpha particles can travel before striking a plate, thereby reducing the noise signal amplitude produced by these particles. The time correlation between signal pulses from fission events permits time discrimination to be used to reject alpha pile-up and noise pulses, allowing the use of less enriched, and thus less expensive, uranium-235 in the coating. Another advantage provided by this invention is that two or more of the electrode plate assemblies of the type disclosed can conveniently be connected in end-to-end relation to provide electrode plates of any desired length. The mechanical strength of the disclosed fission counter electrode plate assembly is also enhanced by the use of curved surfaces and relatively large insulator rings 16a-16c and 20a-20c which position the electrode plates 24.

What is claimed is:

1. An array of electrode plates uniformly spaced apart from one another about an axis, each of said electrode plates having a spiral-arc configuration in a plane perpendicular to said axis, inner edges of said electrode plates being parallel with and spaced equidistant from said axis and said electrode plates spiralling in the same direction relative to said axis with the spacing between adjacent ones of said electrode plates remaining constant as the distance between the side surfaces thereof and said axis increases.

2. The apparatus of claim 1 wherein the curvature of each of said electrode plates is defined by the equation:

$$\theta = \sqrt{\frac{r^2}{k^2} - 1} - \cos^{-1}\left(\frac{k}{r}\right)$$

wherein
 $\theta$ = the angle, expressed in radians, between (1) a line which intersects an inner edge of an electrode plate and which is perpendicular to and intersects said axis, and (2) a line which intersects any selected point on the side surface extending from said inner edge of the same electrode plate and which is perpendicular to and intersects said axis;
 r = the distance between said axis and said point, and
 k = the minimum permissible spacing between said axis and said inner edge of the electrode plate.

3. The apparatus of claim 1 including:
 a central support tube;
 inner support rings mounted in longitudinally spaced relation on said central support tube; and
 outer support rings respectively concentrically spaced around said inner support rings, said electrode plates being disposed between and attached to said inner and outer support rings.

4. The apparatus of claim 3 wherein a plurality of slots corresponding to the number of said electrode plates are disposed about the outer periphery of each of said inner rings and the inner periphery of each of said outer rings, and the attachment of said electrode plates to said inner and outer support rings is effected by inner and outer edge portions of said electrode plates respectively extending into said slots.

5. The apparatus of claim 1 including:
 a coating of fissile material on the side surfaces of said electrode plates; and means for maintaining adjacent ones of said electrode plates at different electrical potentials.

6. The apparatus of claim 5 wherein the curvature of each of said electrode plates is defined by the equation:

$$\theta = \sqrt{\frac{r^2}{k^2} - 1} - \cos^{-1}\left(\frac{k}{r}\right)$$

wherein
$\theta$ = the angle, expressed in radians, between (1) a line which intersects an inner edge of an electrode plate and which is perpendicular to and intersects said axis, and (2) a line which intersects any selected point on the side surface extending from said inner edge of the same electrode plate and which is perpendicular to and intersects said axis;
r = the distance between said axis and said point, and
k = the minimum permissible spacing between said axis and the inner edge of the electrode plate.

7. The apparatus of claim 5 including:
a central support tube;
inner support rings mounted in longitudinally spaced relation on said central support tube; and
outer support rings respectively concentrically spaced around said inner support rings, said electrode plates being disposed between and attached to said inner and outer support rings.

8. The apparatus of claim 7 wherein a plurality of slots corresponding to the number of said electrode plates are disposed about the outer periphery of each of said inner rings and the inner periphery of each of said outer rings, and the attachment of said electrode plates to said inner and outer support rings is effected by inner and outer edge portions of said electrode plates respectively extending into said slots.

9. The apparatus of claim 5 including:
a housing enclosing said electrode plates; and
an ionizable gas in said housing.

10. The apparatus of claim 9 wherein said gas consists of about 80% argon and about 20% carbon tetrafluoride.

11. The apparatus of claim 9 including signal processing means responsive to voltage pulses generated in said electrode plates by ionization of said gas resulting from fission events occurring on said electrode plates.

12. The apparatus of claim 11 wherein said signal processing means comprises a plurality of inductors respectively electrically coupled to alternate ones of said electrode plates and forming, in conjunction with the capacitances between said electrode plates, a delay line.

13. The apparatus of claim 12 wherein one end of said delay line is connected to a voltage supply means and further to a first filter amplifier and a first pulse height discriminator, the other end of said delay line is connected to a second filter amplifier and a second pulse height discriminator, and said first and second pulse height discriminators are connected to a time interval discriminator.

* * * * *